US012658536B2

(12) United States Patent
Shin et al.

(10) Patent No.: US 12,658,536 B2
(45) Date of Patent: Jun. 16, 2026

(54) ELECTRODE LEAD MADE OF DISSIMILAR METALS AND METHOD OF MANUFACTURING THE SAME

(71) Applicant: LG Energy Solution, Ltd., Seoul (KR)

(72) Inventors: Ju Hwan Shin, Daejeon (KR); Hyoung Suk Lee, Daejeon (KR); Soon Chang Hong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 638 days.

(21) Appl. No.: 17/795,140

(22) PCT Filed: Mar. 15, 2021

(86) PCT No.: PCT/KR2021/003182
§ 371 (c)(1),
(2) Date: Jul. 25, 2022

(87) PCT Pub. No.: WO2021/206302
PCT Pub. Date: Oct. 14, 2021

(65) Prior Publication Data
US 2023/0065133 A1 Mar. 2, 2023

(30) Foreign Application Priority Data

Apr. 7, 2020 (KR) ........................ 10-2020-0042213

(51) Int. Cl.
*H01M 50/581* (2021.01)
*H01M 50/119* (2021.01)
(Continued)

(52) U.S. Cl.
CPC ....... *H01M 50/541* (2021.01); *H01M 50/119* (2021.01); *H01M 50/548* (2021.01); *H01M 50/581* (2021.01); *H01M 10/125* (2013.01)

(58) Field of Classification Search
CPC ............. H01M 10/125; H01M 50/119; H01M 50/204; H01M 50/514; H01M 50/516;
(Continued)

(56) References Cited

U.S. PATENT DOCUMENTS

| 5,631,619 A | 5/1997 | Evans | |
| 2001/0001054 A1* | 5/2001 | Gillman | C22C 11/08 29/623.5 |

(Continued)

FOREIGN PATENT DOCUMENTS

| CN | 104115309 A | 10/2014 |
| EP | 2793296 A1 | 10/2014 |

(Continued)

OTHER PUBLICATIONS

JP2017071804A, Matsuyama, et al. "Metal film, anode for lithium ion battery, lithium ion battery, and manufacturing method of metal film", machine English translation retrieved from https://worldwide.espacenet.com/ Date Mar. 7, 2025 (Year: 2017).*

(Continued)

*Primary Examiner* — Tiffany Legette
*Assistant Examiner* — Jared Hansen
(74) *Attorney, Agent, or Firm* — Lerner David LLP

(57) ABSTRACT

The present invention relates to an electrode lead made of dissimilar metals and a method of manufacturing the same, and more particularly to an electrode lead including a first metal plate and a second metal plate, wherein a first metal constituting the first metal plate and second metals having a lower melting temperature than the first metal are mixed in the second metal plate in the state in which the second metals are dispersed, and a method of manufacturing the same.

14 Claims, 8 Drawing Sheets

(51) Int. Cl.
  *H01M 50/541* (2021.01)
  *H01M 50/548* (2021.01)
  *H01M 10/12* (2006.01)

(58) Field of Classification Search
  CPC ............. H01M 50/528; H01M 50/541; H01M 50/543; H01M 50/548; H01M 50/557; H01M 50/562; H01M 50/572; H01M 50/581; H01M 50/583; H01M 2200/10; Y02E 60/10
  See application file for complete search history.

(56) References Cited

U.S. PATENT DOCUMENTS

| | | | |
|---|---|---|---|
| 2002/0113685 A1 | 8/2002 | Izaki et al. | |
| 2005/0058906 A1* | 3/2005 | Sugiyama | H01M 4/134 |
| | | | 429/231.95 |
| 2006/0008698 A1 | 1/2006 | Kim et al. | |
| 2010/0322811 A1 | 12/2010 | Hodjat et al. | |
| 2011/0293995 A1* | 12/2011 | Sasaki | H01M 50/55 |
| | | | 174/133 R |
| 2013/0236752 A1 | 9/2013 | Yang et al. | |
| 2013/0323549 A1* | 12/2013 | Choi | H01M 50/507 |
| | | | 429/62 |
| 2013/0323577 A1 | 12/2013 | Yang et al. | |
| 2014/0065467 A1 | 3/2014 | Choi et al. | |
| 2015/0295340 A1* | 10/2015 | Boudreaux | H01R 31/02 |
| | | | 439/488 |
| 2016/0028068 A1 | 1/2016 | Yang et al. | |
| 2016/0126526 A1* | 5/2016 | Yang | H01M 50/522 |
| | | | 429/211 |
| 2016/0240342 A1 | 8/2016 | Yoneda | |
| 2016/0260951 A1 | 9/2016 | Umeyama et al. | |
| 2018/0301302 A1* | 10/2018 | Furuuchi | G01M 3/16 |
| 2018/0361708 A1 | 12/2018 | Hirano | |

FOREIGN PATENT DOCUMENTS

| | | | | | |
|---|---|---|---|---|---|
| JP | S62107347 | U | | 7/1987 | |
| JP | H04341508 | A | | 11/1992 | |
| JP | H11503864 | A | | 3/1999 | |
| JP | 3478785 | B2 | | 12/2003 | |
| JP | 2007533099 | A | | 11/2007 | |
| JP | 2014519153 | A | | 8/2014 | |
| JP | 2015076295 | A | | 4/2015 | |
| JP | 2015513205 | A | | 4/2015 | |
| JP | 5726954 | B2 | | 6/2015 | |
| JP | 2017071804 | A | * | 4/2017 | |
| JP | 6454262 | B2 | | 1/2019 | |
| KR | 20000038817 | A | | 7/2000 | |
| KR | 20060045625 | A | | 5/2006 | |
| KR | 20120027407 | A | | 3/2012 | |
| KR | 20120048404 | A | | 5/2012 | |
| KR | 20130030199 | A | | 3/2013 | |
| KR | 20130080023 | A | | 7/2013 | |
| KR | 20130089375 | A | * | 8/2013 | .......... H01M 50/572 |
| KR | 20150034637 | A | | 4/2015 | |
| KR | 20150062694 | A | | 6/2015 | |
| KR | 20160065853 | A | | 6/2016 | |
| KR | 20210050255 | A | | 5/2021 | |

OTHER PUBLICATIONS

KR20130089375A, Kim, et al., "Secondary battery and element used for secondary battery", machine English translation retrieved from https://worldwide.espacenet.com/ Date: Oct. 14, 2025 (Year: 2013).*

International Search Report for Application No. PCT/KR2021/003182 mailed Jun. 30, 2021, pp. 1-4.

Search Report dated Sep. 20, 2023 from the Office Action for Chinese Application No. 202180007141.4 issued Sep. 22, 2023, 3 pages. [See p. 1-2, categorizing the cited references].

Extended European Search Report including Written Opinion for Application No. 21785356.3 dated Nov. 7, 2024. 9 pgs.

* cited by examiner

【FIG. 1】
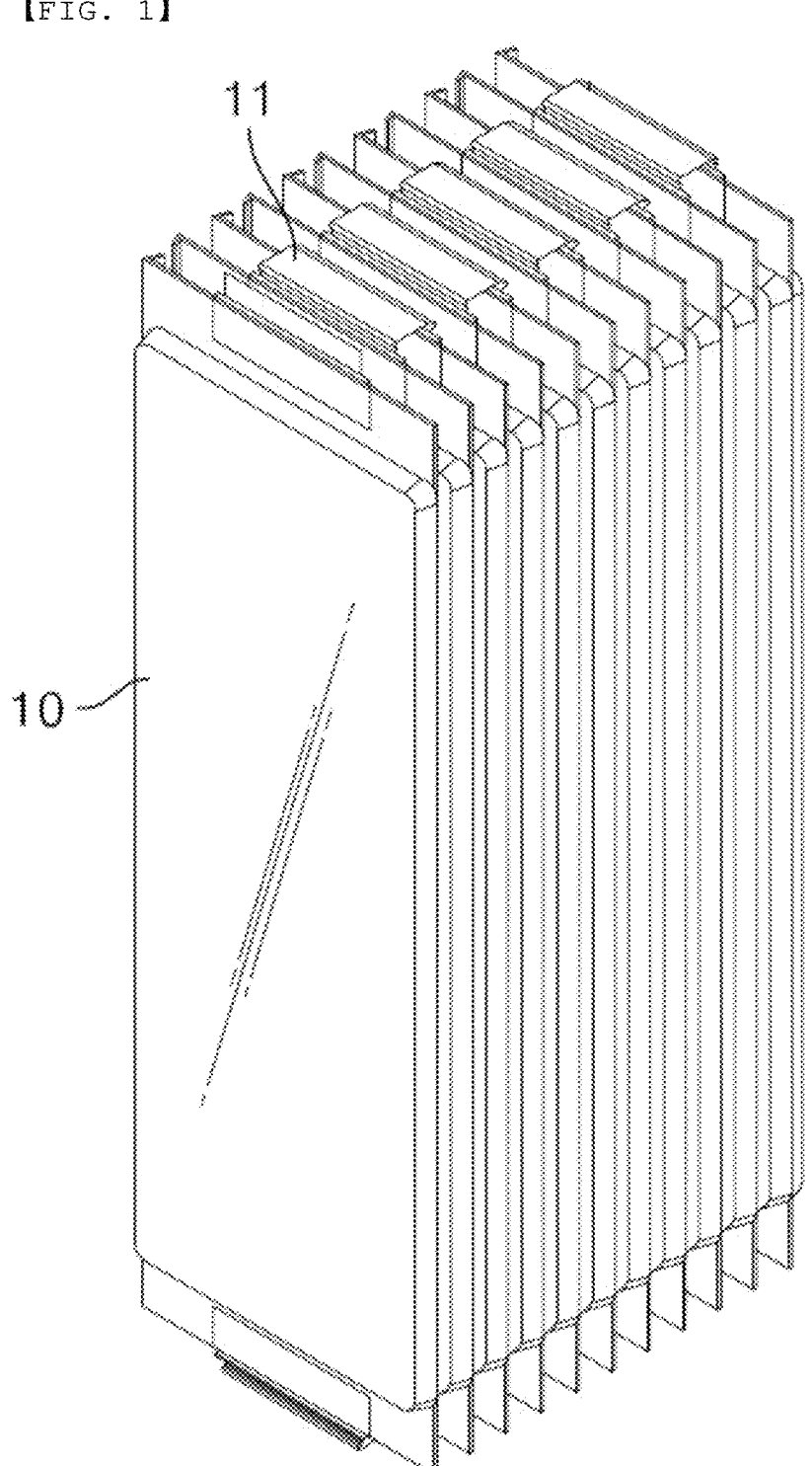

【FIG. 2】
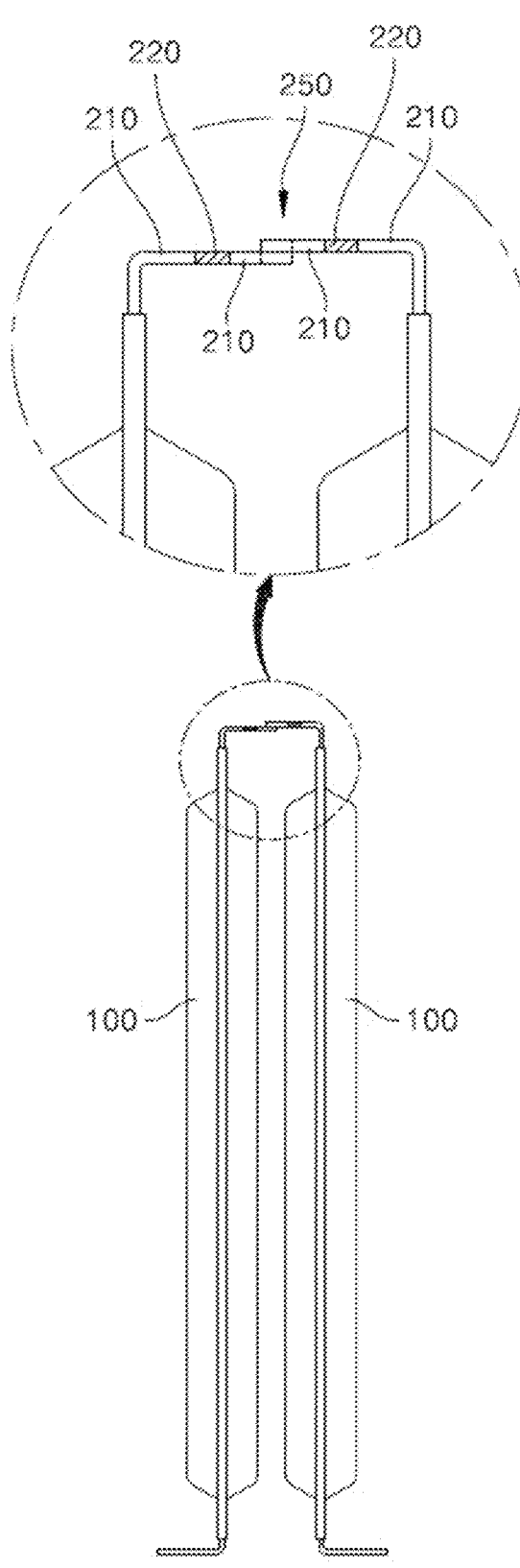

【FIG. 3】
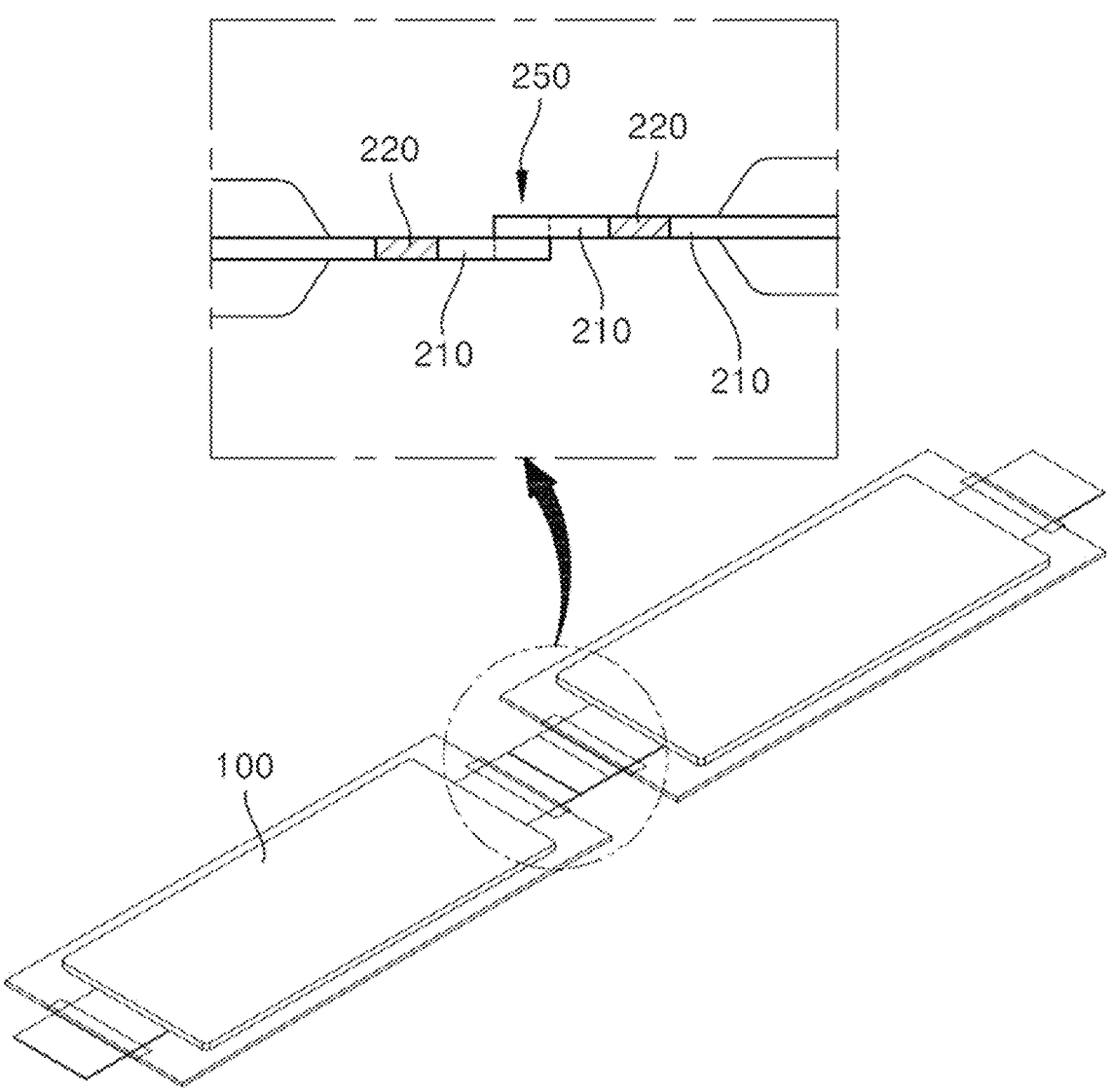

【FIG. 4】
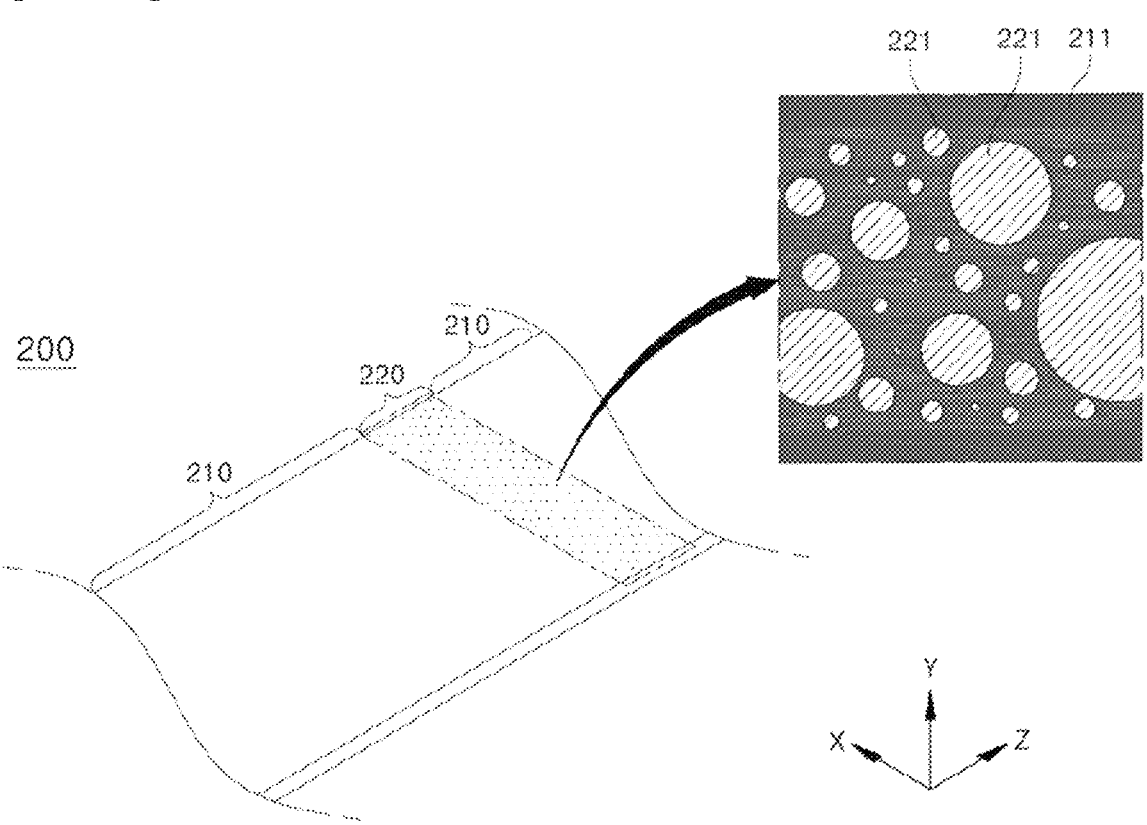
【FIG. 5】
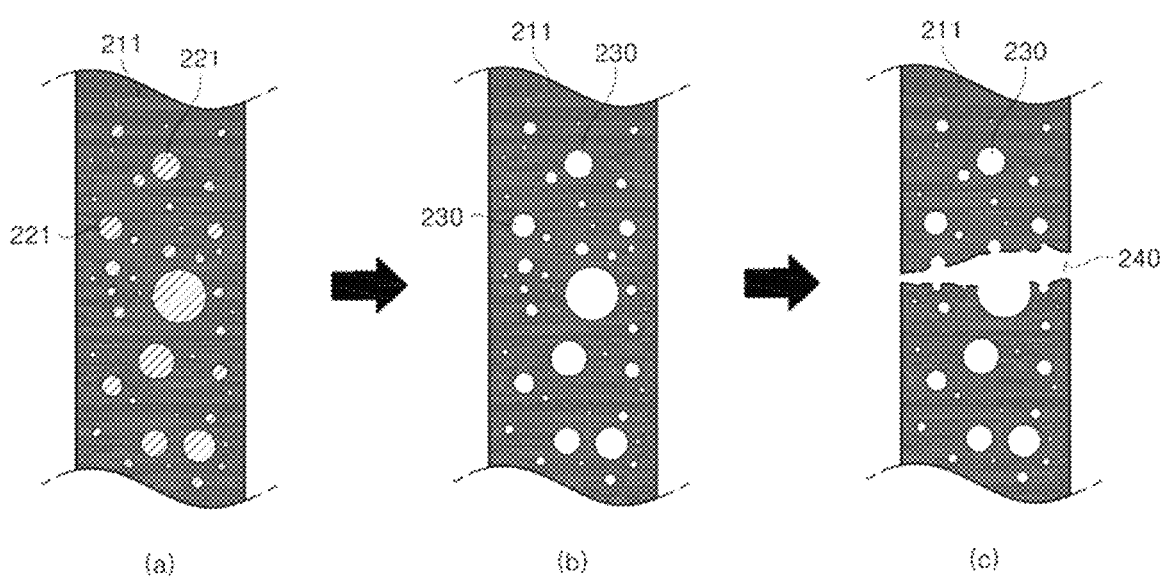
(a)          (b)          (c)

【FIG. 6】
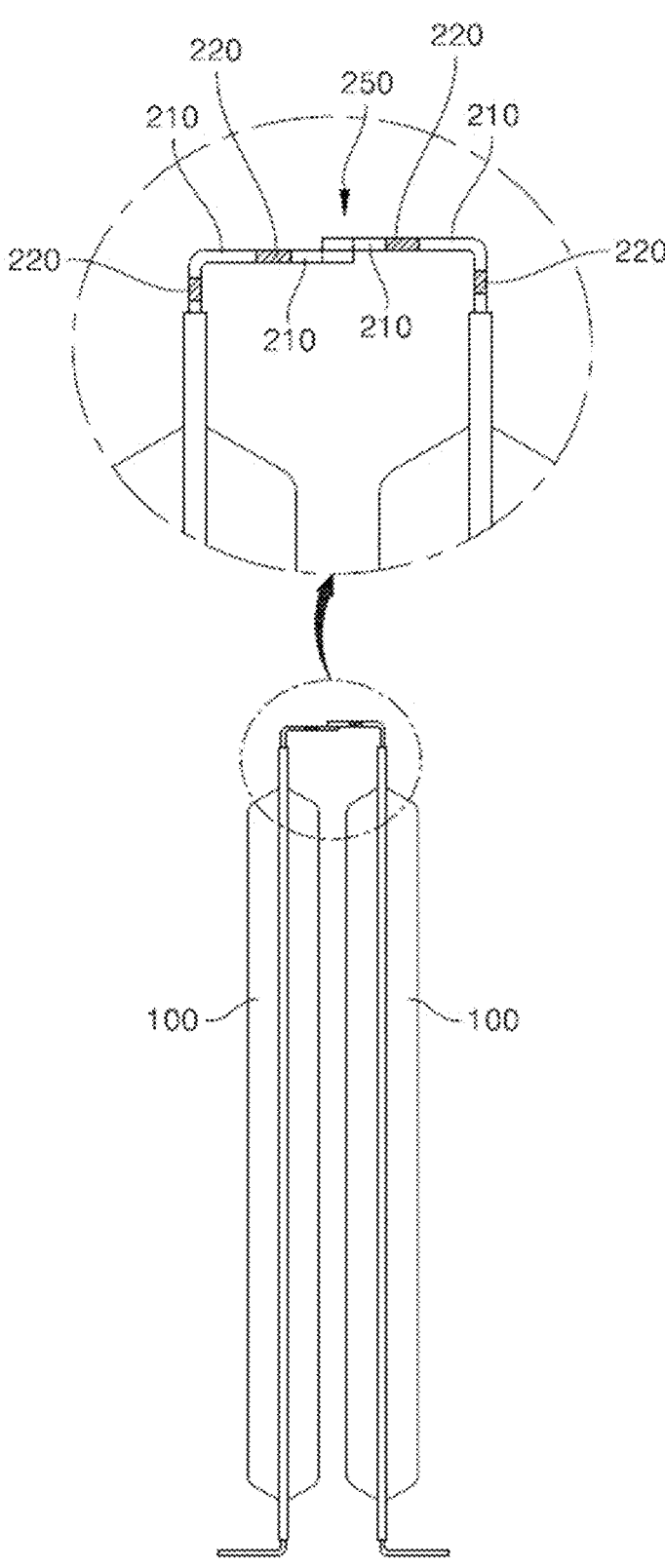

【FIG. 7】
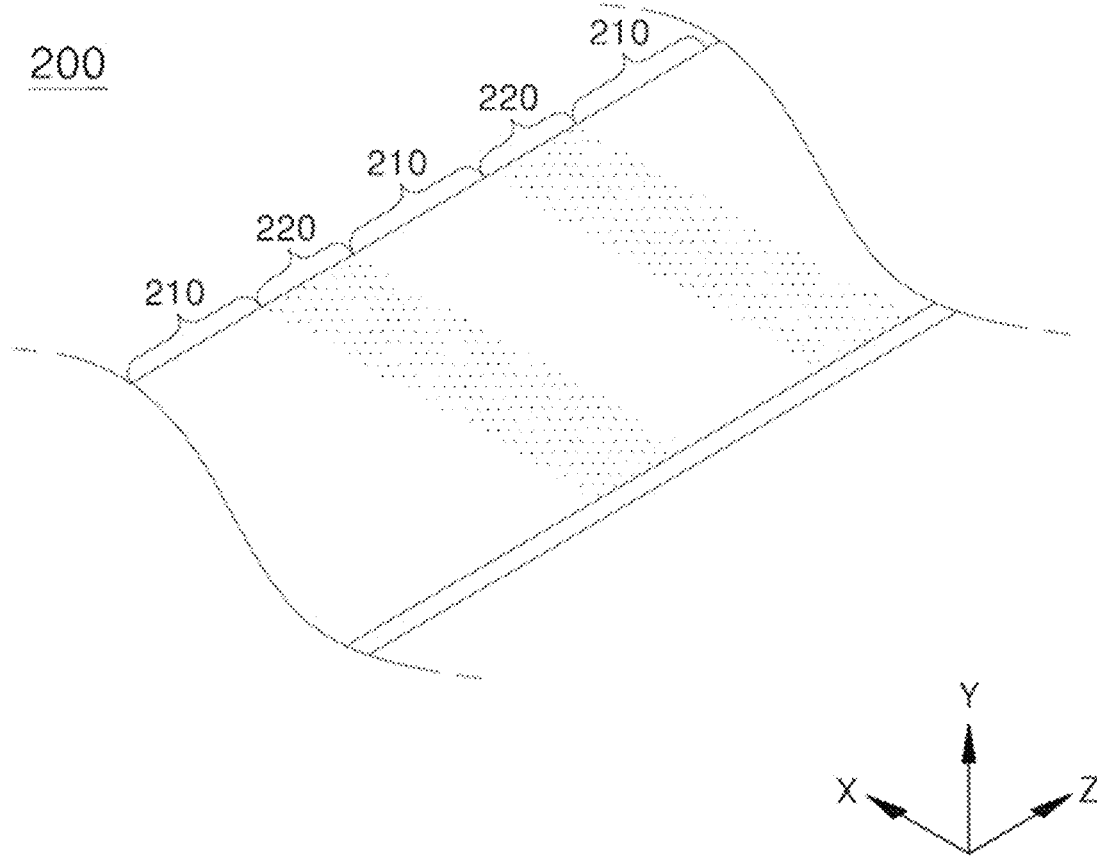

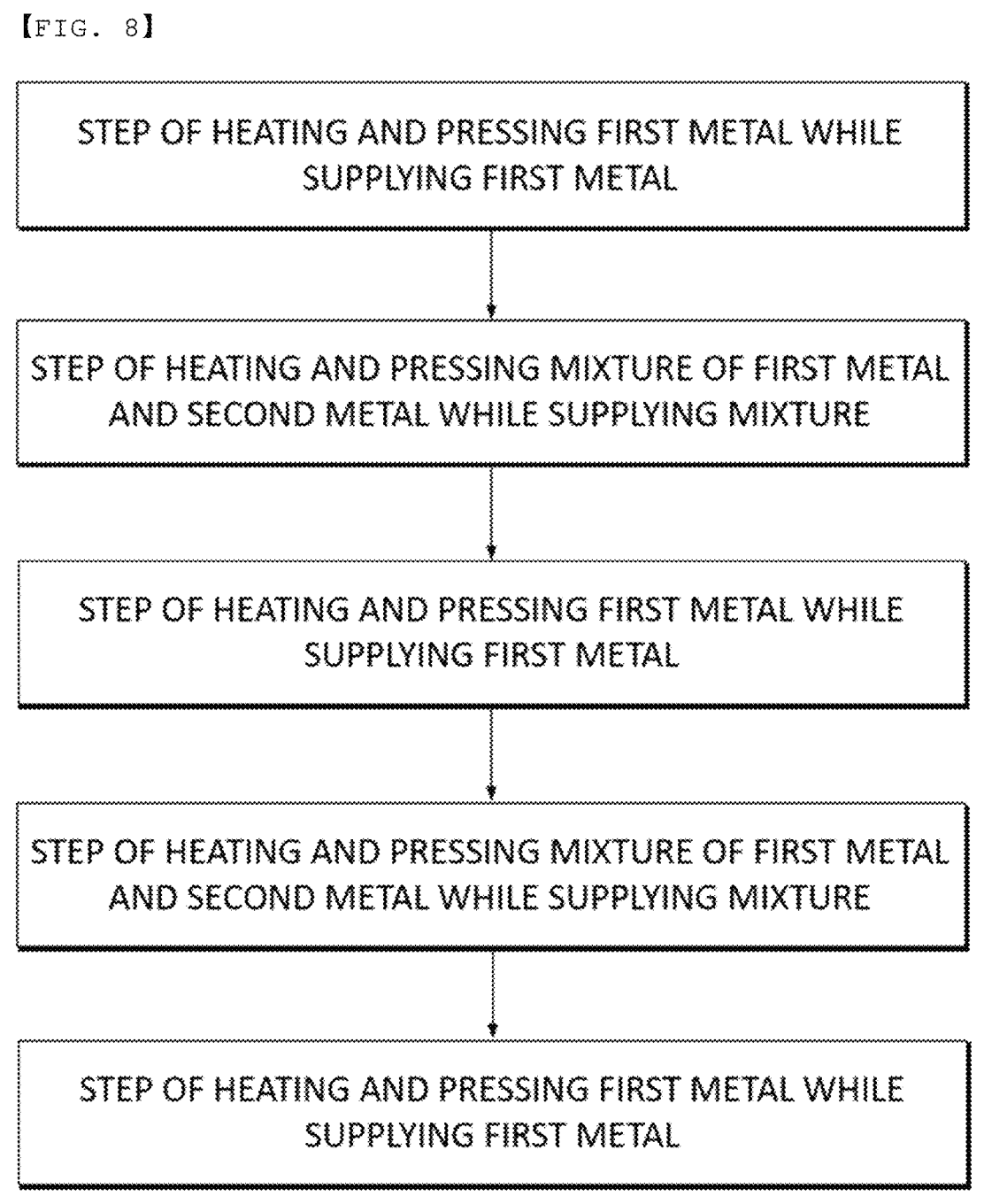

【FIG. 8】

STEP OF HEATING AND PRESSING FIRST METAL WHILE SUPPLYING FIRST METAL

STEP OF HEATING AND PRESSING MIXTURE OF FIRST METAL AND SECOND METAL WHILE SUPPLYING MIXTURE

STEP OF HEATING AND PRESSING FIRST METAL WHILE SUPPLYING FIRST METAL

STEP OF HEATING AND PRESSING MIXTURE OF FIRST METAL AND SECOND METAL WHILE SUPPLYING MIXTURE

STEP OF HEATING AND PRESSING FIRST METAL WHILE SUPPLYING FIRST METAL

【FIG. 9】
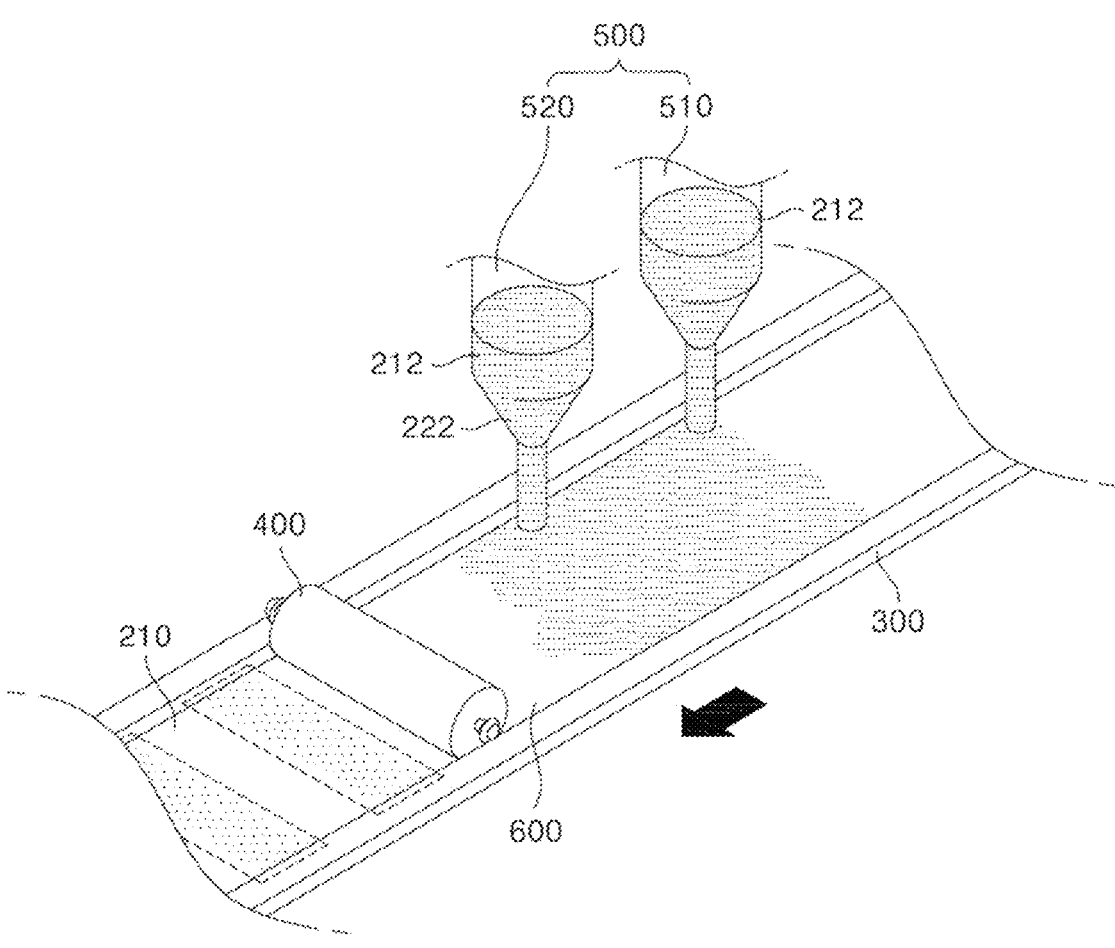

ELECTRODE LEAD MADE OF DISSIMILAR METALS AND METHOD OF MANUFACTURING THE SAME

CROSS-REFERENCE TO RELATED APPLICATIONS

This application is a national phase entry under 35 U.S.C. § 371 of International Application No. PCT/KR2021/003182, filed on Mar. 15, 2021, which claims priority to Korean Patent Application No. 10-2020-0042213, filed on Apr. 7, 2020, the disclosures of which are incorporated herein by reference in their entireties.

TECHNICAL FIELD

The present invention relates to an electrode lead made of dissimilar metals and a method of manufacturing the same, and more particularly to an electrode lead that is capable of securely cutting off the flow of current while having high resistance to external impact and that is capable of easily adjusting current cutoff temperature in a battery module and a method of manufacturing the same.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Such secondary batteries may be classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

A secondary battery used for small devices includes several battery cells. For vehicles, however, a battery module including a plurality of battery cells electrically connected to each other is used. That is, as shown in FIG. 1, which is a perspective view of a conventional battery module including a plurality of pouch cells connected to each other, a plurality of battery cells 10 is connected to each other in parallel and/or in series via electrode leads 11 or a separate busbar (not shown).

Meanwhile, in the case in which high current flows in a secondary battery within a short time due to exposure to high temperature, overcharging, external short circuit, needle penetration, or local damage, heat may be generated in the battery, whereby the battery may explode. For this reason, a fuse configured to prevent the occurrence of the above-described event is generally mounted, whereby part expenses and volume of the battery are increased.

In connection therewith, Patent Document (Korean Patent Application Publication No. 2015-0062694) discloses a part for secondary batteries installed on a path of current flowing in a secondary battery, wherein the part includes a metal plate having a slit formed in a lateral direction and a metal bridge having a lower melting point than the metal plate, the metal bridge being joined to the metal plate in a state of filling the slit.

The above patent document has an advantage in that, in the case in which overcurrent flows in the secondary battery, the part installed on the path of current flowing in the secondary battery is rapidly ruptured, whereby overcurrent is interrupted, and therefore safety in use of the secondary battery is secured, but has problems in that it is not easy to join the metal plate and the metal bridge to each other, since the metal plate and the metal bridge are dissimilar metals, and therefore the metal bridge must be joined to the metal plate so as to wrap the regions of the upper surface and the lower surface of the metal plate that are adjacent to the slit, whereby the part is structurally unstable, has low resistance to external impact, and is not easy to manufacture.

PRIOR ART DOCUMENT (Patent Document 1) Korean Patent Application Publication No. 2015-0062694

DISCLOSURE

Technical Problem

The present invention has been made in view of the above problems, and it is an object of the present invention to provide an electrode lead capable of securely cutting off the flow of current even in the case in which the temperature of a battery module is abnormally increased and a method of manufacturing the same.

It is another object of the present invention to provide an electrode lead that has high resistance to external impact and that is easy to manufacture and a method of manufacturing the same.

Technical Solution

In order to accomplish the above objects, an electrode lead of a battery cell according to the present invention includes a first metal plate and a second metal plate, wherein a first metal constituting the first metal plate and second metals having a lower melting temperature than the first metal are mixed in the second metal plate in the state in which the second metals are dispersed.

Also, in the electrode lead according to the present invention, the upper surface and the lower surface of each of the second metals may be exposed out of the second metal plate, and the side surface of each of the second metals may be present in tight contact with the first metal.

Also, in the electrode lead according to the present invention, the second metals may have different outer surface areas.

Also, in the electrode lead according to the present invention, when heated to a predetermined temperature or higher, the second metals may be melted, whereby the sectional area of the second metal plate may be reduced.

Also, in the electrode lead according to the present invention, when heated to the predetermined temperature or higher, a rupture portion may be formed in the second metal plate.

Also, in the electrode lead according to the present invention, the first metal may be copper or aluminum, and each of the second metals may be a metal having a lower melting temperature than the first metal.

Also, in the electrode lead according to the present invention, each of the second metals may include at least one of indium (In), tin (Sn), and an alloy thereof.

Also, in the electrode lead according to the present invention, the first metal plate may be provided in two, the second metal plate may be provided in one, and the second metal plate may be located between the first metal plates.

Also, in the electrode lead according to the present invention, the first metal plate and the second metal plate may be alternately located in a longitudinal direction, and the first metal plates may be located at opposite edges in the longitudinal direction.

In addition, an electrode lead manufacturing method according to the present invention includes a first step of applying a predetermined temperature and pressure to a first metal powder while continuously supplying the first metal powder to form a first metal plate; a second step of applying a predetermined temperature and pressure to a metal powder mixture of a first metal powder and a second metal powder while continuously supplying the metal powder mixture for a predetermined time to form a second metal plate; and a third step of applying a predetermined temperature and pressure to a first metal powder while continuously supplying the first metal powder to form a first metal plate.

Also, in the electrode lead manufacturing method according to the present invention, the first metal powder may be copper or aluminum, and the second metal powder may be a metal having a lower melting temperature than the first metal powder.

Also, in the electrode lead manufacturing method according to the present invention, the particle size of the second metal powder may be greater than the particle size of the first metal powder.

In addition, the electrode lead manufacturing method according to the present invention may further include a fourth step of applying a predetermined temperature and pressure to a metal powder mixture of a first metal powder and a second metal powder while continuously supplying the metal powder mixture for a predetermined time to form a second metal plate; and a fifth step of applying a predetermined temperature and pressure to a first metal powder while continuously supplying the first metal powder to form a first metal plate.

In addition, the present invention provides a battery module including a plurality of battery cells connected to each other, wherein each of the battery cells includes the electrode lead.

Advantageous Effects

In an electrode lead according to the present invention and a method of manufacturing the same, a second metal plate, which is made of a mixture of a first metal and a second metal having a lower melting temperature than the first metal, is located between first metal plates, each of which is made of a first metal, whereby the first metal plate and the second metal plate are strongly coupled to each other, and therefore the electrode lead has relatively high resistance to external impact.

Also, in the electrode lead according to the present invention and the method of manufacturing the same, when the temperature in a battery module is increased to a melting temperature of the second metal, a predetermined region of the second metal plate is ruptured, whereby the flow of current is interrupted. Consequently, it is possible to easily adjust current cutoff temperature by changing the kind of the second metal.

Furthermore, in the electrode lead according to the present invention and the method of manufacturing the same, the electrode lead also serves as a fuse, whereby it is not necessary to mount a separate fuse in the battery module, and therefore it is possible to reduce manufacturing costs together with improvement in energy density.

DESCRIPTION OF DRAWINGS

FIG. 1 is a perspective view of a conventional battery module including a plurality of battery cells connected to each other.

FIG. 2 is a conceptual view of a battery module configured such that a plurality of battery cells, each of which includes an electrode lead according to a first preferred embodiment of the present invention, is connected to each other side by side in a vertical direction.

FIG. 3 is a conceptual view of a battery module configured such that a plurality of battery cells, each of which includes the electrode lead according to the first preferred embodiment of the present invention, is connected to each other in a horizontal direction.

FIG. 4 is a conceptual view of the electrode lead according to the first preferred embodiment of the present invention.

FIG. 5 is a conceptual view illustrating rupture of the electrode lead according to the first preferred embodiment of the present invention.

FIG. 6 is a conceptual view of a battery module configured such that a plurality of battery cells, each of which includes an electrode lead according to a second preferred embodiment of the present invention, is connected to each other side by side in a vertical direction.

FIG. 7 is a conceptual view of the electrode lead according to the second preferred embodiment of the present invention.

FIG. 8 is a flowchart illustrating a method of manufacturing the electrode lead according to the second preferred embodiment of the present invention.

FIG. 9 is a schematic view of an apparatus for manufacturing the electrode lead according to the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, an electrode lead made of dissimilar metals according to the present invention and a method of manufacturing the same will be described.

FIG. 2 is a conceptual view of a battery module configured such that a plurality of battery cells, each of which includes an electrode lead according to a first preferred embodiment of the present invention, is connected to each other side by side in a vertical direction.

Referring to FIG. 2, a plurality of battery cells, such as a plurality of pouch cells, is disposed in a vertical direction, and electrode leads according to the first preferred embodiment of the present invention are connected to each other. Specifically, electrode leads 200 extending from electrode assemblies (not shown) received in cases 100 are bent at a predetermined angle and are then connected to each other, whereby adjacent battery cells are connected to each other in series or in parallel.

Here, each of the electrode leads 200 includes a first metal plate 210 and a second metal plate 220 configured to rupture when the temperature of the second metal plate increases to a predetermined temperature. A joint portion 250 is formed at a portion, i.e. the distal end, of the first metal plate 210 using a conventional joining method. The construction of the electrode lead 200 will be described below in detail.

Meanwhile, a battery cell, specifically a pouch-shaped battery cell, includes an electrode assembly (not shown) and a case 100. The electrode assembly may be a jelly-roll type electrode assembly, which is configured to have a structure in which a long sheet type positive electrode and a long sheet type negative electrode are wound in the state in which a separator is interposed therebetween, a stacked type electrode assembly including unit cells, each of which is configured to have a structure in which a rectangular positive electrode and a rectangular negative electrode are stacked in the state in which a separator is interposed therebetween, a stacked and folded type electrode assembly, which is configured to have a structure in which unit cells are wound using a long separation film, or a laminated and stacked type electrode assembly, which is configured to have a structure in which unit cells are stacked in the state in which a separator is interposed therebetween and are then attached to each other. However, the present invention is not limited thereto.

The electrode assembly is mounted in the case. The case is generally configured to have a laminate sheet structure including an inner layer, a metal layer, and an outer layer. The inner layer is disposed in direct contact with the electrode assembly, and therefore the inner layer must exhibit high insulation properties and high resistance to an electrolytic solution. In addition, the inner layer must exhibit high sealability in order to hermetically seal the case. The inner layer may be made of a material selected from among a polyolefin-based resin, such as polypropylene, polyethylene, polyethylene acrylate, or polybutylene, a polyurethane resin, and a polyimide resin.

The metal layer, which is disposed so as to abut the inner layer, corresponds to a barrier layer configured to prevent moisture or various kinds of gas from permeating into the battery from the outside. Aluminum foil, which is light and easily shapeable, may be used as a preferred material for the metal layer.

The outer layer is provided on the other surface of the metal layer. The outer layer may be made of a heat-resistant polymer that exhibits excellent tensile strength, resistance to moisture permeation, and resistance to air transmission such that the outer layer exhibits high heat resistance and chemical resistance while protecting the electrode assembly. As an example, the outer layer may be made of nylon or polyethylene terephthalate. However, the present invention is not limited thereto.

Meanwhile, the electrode leads 200, which include a positive electrode lead and a negative electrode lead, may be configured to have a structure in which the electrode leads are exposed outwards from the case in the state in which positive electrode tabs and negative electrode tabs of the electrode assembly are electrically connected to the electrode leads, respectively. The battery cell described above corresponds to commonly known constructions, and therefore a more detailed description thereof will be omitted.

FIG. 3 is a conceptual view of a battery module configured such that a plurality of battery cells, each of which includes the electrode lead according to the first preferred embodiment of the present invention, is connected to each other in a horizontal direction.

In FIG. 3, two battery cells are disposed side by side in the horizontal direction, unlike FIG. 2. FIG. 3 is similar in construction to FIG. 2 except that adjacent battery cells are disposed in series or in parallel.

FIG. 4 is a conceptual view of the electrode lead according to the first preferred embodiment of the present invention, and FIG. 5 is a conceptual view illustrating rupture of the electrode lead according to the first preferred embodiment of the present invention.

The electrode lead 200, which electrically connects terminals of battery modules to each other, is configured in a flat shape having a predetermined thickness (Y-axis direction), a predetermined width (X-axis direction), and a predetermined length (Z-axis direction), and includes a first metal plate 210 corresponding to a non-cutting region and a second metal plate 220 corresponding to a cutting region.

In addition to a first metal constituting the first metal plate 210, the second metal plate 220 further includes a second metal having a different melting temperature from the first metal constituting the first metal plate. That is, second metals 221 having the same outer surface area or different outer surface areas are present in the second metal plate 220 in a dispersed state.

Here, that the second metals 221 are dispersed in the second metal plate 220 means that the second metals 221 having predetermined sizes and surface areas are completely inserted or impregnated into a thickness direction of the second metal plate 220 (Y-axis direction) regularly or irregularly. That is, the second metals 221 are exposed outwards from the upper surface and the lower surface of the second metal plate 220, whereas the side surface of each of the second metals is in completely tight contact with the first metal constituting the first metal plate 210.

Of course, the portions of the second metals 221 exposed from the upper and lower surfaces of the second metal plate 220 are present in a flat state, although the second metals may maintain the original shape at the time of manufacture thereof, such as a spherical shape or a needle shape.

For the positive electrode lead, it is preferable for the first metal plate 210 to be made of an aluminum (Al) material. The reason for this is that it is possible to improve weldability and to minimize contact resistance at a coupling portion. For the negative electrode lead, on the other hand, the first metal plate 210 be made of copper (Cu) or a copper material coated with nickel (Ni).

The second metal plate 220 is not particularly restricted as long as the second metal plate is made of a metal having a lower melting temperature than aluminum (Al) or copper (Cu) constituting the first metal plate 210. As an example, the second metal plate may be made of indium (In), tin (Sn), or an alloy thereof. The reason for this is that, in the case in which the battery module is overheated due to short circuit or overcharging, it is necessary to rapidly rupture the electrode lead 200 in order to release electrical connection in the battery module. The second metals may be freely changed depending on a desired current cutoff temperature.

That is, as shown in FIG. 5, when the battery module is normally operated, current flows via the flat electrode lead 200 (FIG. 5(*a*)). When the battery module is overheated to a melting temperature or higher of the second metals 221 due to short circuit in the battery module, however, the second metals 221, each of which has a relatively low melting temperature, are melted first, whereby pores 230 are formed in the portions at which the second metals 221 were present (see FIG. 5(*b*)). As a result, a rupture portion 240 is formed in a predetermined region, i.e. a region at which the second metals 221 are located adjacent to each other, whereby the electrode lead 200 is ruptured (see FIG. 5(*c*)).

Here, the technical principle by which rupture occurs based on the pores 230, in which the second metals 221 were present, will be described in brief. When the second metals 221 are melted and thus the pores 230 are formed, the surface area in which current is movable is reduced in the vicinity of the pores 230, whereby resistance is increased. Consequently, heat is abruptly generated based on the region in which the pores 230 are formed, whereby the temperature of the first metal 211 is increased to the melting temperature thereof. As a result, the first metal connecting the pores 230 to each other is also melted, whereby the rupture portion 240 is formed in the second metal plate 220 and thus the second metal plate is cut.

Meanwhile, it is preferable for the second metals 221 to be present so as to have a surface area equivalent to 20 to 90% of the surface area of the electrode lead 200 in the region thereof in the lateral direction (X-axis direction), the longitudinal direction (Z-axis direction), and the thickness direction (Y-axis direction) of the electrode lead. In the case in which the surface area of the second metals is less than 20% of the surface area of the electrode lead, time taken until the electrode lead is ruptured is too long. In the case in which the surface area of the second metals is greater than 90% of the surface area of the electrode lead, on the other hand, the electrode lead 200 may be ruptured by temporary overheating. Consequently, the above range is desirable.

Here, the second metals 221 may be located within a range of 5 to 10 mm in the longitudinal direction (Z-axis direction) of the electrode lead 200.

FIG. 6 is a conceptual view of a battery module configured such that a plurality of battery cells, each of which includes an electrode lead according to a second preferred embodiment of the present invention, is connected to each other side by side in a vertical direction, and FIG. 7 is a conceptual view of the electrode lead according to the second preferred embodiment of the present invention.

The electrode lead according to the second preferred embodiment of the present invention is identical in construction to the electrode lead according to the first embodiment except that two second metal plates 220 are spaced apart from each other by a predetermined distance. Hereinafter, therefore, only different constructions will be described.

In the case in which two second metal plates 220, each of which includes second metals 221, are provided so as to be spaced apart from each other by a predetermined distance, it is possible to further increase a safety factor. That is, in the case in which one second metal plate 220 is provided, relatively long time is incurred until the electrode lead is ruptured or the occurrence of short circuit may be inhibited. In the case in which two second metal plates 220 are present at the electrode lead 200, however, it is possible to more securely induce rupture of the electrode lead. Although two second metal plates 220 are shown in FIGS. 6 and 7, which is merely an illustration, it is obvious that three or more second metal plates may be provided.

Next, a method and apparatus for manufacturing the electrode lead according to the second embodiment of the present invention described above will be described.

FIG. 8 is a flowchart illustrating a method of manufacturing the electrode lead according to the second preferred embodiment of the present invention, and FIG. 9 is a schematic view of an apparatus for manufacturing the electrode lead according to the present invention.

The method of manufacturing the electrode lead according to the second embodiment of the present invention may include a first step of applying a predetermined temperature and pressure to first metal powder 212 while continuously supplying the first metal powder to form a first metal plate, a second step of applying a predetermined temperature and pressure to a metal powder mixture of first metal powder 212 and second metal powder 222 while continuously supplying the metal powder mixture for a predetermined time to form a second metal plate, a third step of applying a predetermined temperature and pressure to first metal powder 212 while continuously supplying the first metal powder to form a first metal plate, a fourth step of applying a predetermined temperature and pressure to a metal powder mixture of first metal powder 212 and second metal powder 222 while continuously supplying the metal powder mixture for a predetermined time to form a second metal plate, and a fifth step of applying a predetermined temperature and pressure to first metal powder 212 while continuously supplying the first metal powder to form a first metal plate.

The electrode lead manufacturing apparatus according to the present invention may include a conveyor belt 300, a tray 400, a metal particle supply tank 500, a roller 600, and a heating means (not shown).

Specifically, in the first step, first metal powder 212 in a first supply tank 510 is continuously supplied to the tray 400, which is located on the conveyor belt 300, and at the same time the first metal powder is heated to a predetermined temperature while the first metal powder is pressed using the roller 600 to form a first metal plate 210 corresponding to a flat non-cutting region.

In the second step, supply of the first metal powder 212 from the first supply tank 510 is temporarily interrupted, and a metal powder mixture of first metal powder 212 and second metal powder 222 in a second supply tank 520 is heated and pressed using the roller 600 while the metal powder mixture is continuously supplied to the tray 400 to form a second metal plate 220 corresponding to a flat cutting region.

Here, the particle size of the second metal powder 222 may be changed depending on a target rupture current amount of the electrode lead 200. As an example, the particle size of each of the first metal powder 212 and the second metal powder 222 may range from several nm to several mm. It is preferable that the particle size of the second metal powder 222 be greater than the particle size of the first metal powder 212. The particle size of the second metal powder 222 may be 2 to 10 times the particle size of the first metal powder 212. That is, the particle size of the first metal powder 212, which has a relatively high melting point, is reduced in order to adjust sintering temperatures of the first metal powder 212 and the second metal powder 222 so as to be similar to each other. In the case in which the sintering temperatures of the first metal powder 212 and the second metal powder 222 are similar to each other, the particle size ratio therebetween is not limited to the above-defined particle size ratio.

In addition, the heating temperature in the first step and the second step is not particularly restricted. Any temperature capable of sintering the first metal powder 212 and the second metal powder 222 depending on the particle sizes of the first metal powder and the second metal powder is allowed.

In the third step, supply of the metal powder mixture from the second supply tank 520 is temporarily interrupted, and first metal powder 212 in the first supply tank 510 is pressed and heated while the first metal powder is continuously supplied to the tray 400 to form a first metal plate 210 corresponding to the non-cutting region.

After the first to third steps are performed, a second metal plate 220, which is made of the mixture of the first metal powder 212 and the second metal powder 222 and which corresponds to the cutting region, is provided in the middle of the electrode lead, and first metal plates 210, each of which is made of only the first metal powder 212 and each of which corresponds to the non-cutting region, are provided at opposite sides of the second metal plate 220.

The fourth step and the fifth step are repetitions of the second step and the third step, and another second metal plate 220 is formed through the fourth step and the fifth step.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE NUMERALS

100: Case
200: Electrode lead
210: First metal plate
211: First metal 212: First metal powder
220: Second metal plate
221: Second metal 222: Second metal powder
230: Pore
240: Rupture portion
250: Joint portion
300: Conveyor belt
400: Tray
500: Metal particle supply tank
510: First supply tank
520: Second supply tank
600: Roller

The invention claimed is:

1. An electrode lead of a battery cell, the electrode lead comprising:
    a first metal plate made of a first metal; and
    a second metal plate made of the first metal and second metals,
    wherein the second metals have a lower melting temperature than the first metal, and the second metals are mixed within the second metal plate such that the second metals are unevenly dispersed within regions of the first metal, such that the second metal plate has first areas that consist of only the first metal and second areas that consist of only the second metals, a majority of the second areas being circular in plan view, the first metal and the second metals of the second metal plate each having top and bottom surfaces extending along top and bottom same planes, respectively, and each entirely contained in or between the top and bottom same planes,
    wherein none of the second areas extends completely across the second metal plate in a lateral direction perpendicular to an extension direction of the electrode lead, and
    wherein the second areas together have a surface area that is 20% to 90% of a surface area of the second metal plate.

2. The electrode lead according to claim 1, wherein an upper surface and a lower surface of each of the second metals are exposed at outer surfaces of the second metal plate, and a side surface of each of the second metals is in tight contact with the first metal within the second metal plate.

3. The electrode lead according to claim 2, wherein the second metals have different outer surface areas from one another.

4. The electrode lead according to claim 3, wherein, the second metal plate is configured such that, when heated to a predetermined temperature or higher, the second metals are melted, thereby reducing a remaining sectional area of the second metal plate.

5. The electrode lead according to claim 4, wherein, the second metal plate is configured such that, when heated to the predetermined temperature or higher, a rupture portion is formed in the second metal plate.

6. The electrode lead according to claim 1, wherein
    the first metal is copper or aluminum, and
    each of the second metals is a metal having a lower melting temperature than the first metal.

7. The electrode lead according to claim 6, wherein each of the second metals comprises at least one of indium (In), tin (Sn), or an alloy thereof.

8. The electrode lead according to claim 1, wherein
    the first metal plate has first and second portions that are spaced apart from one another, and
    the second metal plate is located between the first and second portions of the first metal plate.

9. The electrode lead according to claim 8, wherein the first metal plate and the second metal plate are arranged along a longitudinal direction of the electrode lead, and
    wherein the first and second portions of the first metal plate are located at opposite edges of the second metal plate in the longitudinal direction.

10. A method of manufacturing the electrode lead according to claim 1, the method comprising:
    a first step of applying a predetermined temperature and pressure to a first metal powder while continuously supplying the first metal powder to form a first region of the first metal plate;
    a second step of applying a predetermined temperature and pressure to a metal powder mixture of a first metal powder and a second metal powder while continuously supplying the metal powder mixture for a predetermined time to form a first region of the second metal plate; and a third step of applying the predetermined temperature and the pressure to the first metal powder while continuously supplying the first metal powder to form a second region of the first metal plate.

11. The method according to claim 10, wherein the first metal powder is copper or aluminum, and wherein the second metal powder is a metal having a lower melting temperature than the first metal powder.

12. The method according to claim 11, wherein a particle size of the second metal powder is greater than a particle size of the first metal powder.

13. The method according to claim 10, further comprising:

a fourth step of applying the predetermined temperature and the pressure to the metal powder mixture of the first metal powder and the second metal powder while continuously supplying the metal powder mixture for the predetermined time to form a second region of the second metal plate; and a fifth step of applying the predetermined temperature and the pressure to the first metal powder while continuously supplying the first metal powder to form a third region of the first metal plate.

14. A battery module comprising a plurality of battery cells connected to each other, wherein each of the battery cells comprises the electrode lead according to claim 1.

\* \* \* \* \*